(12) United States Patent
Zaremba et al.

(10) Patent No.: US 11,772,565 B2
(45) Date of Patent: Oct. 3, 2023

(54) GOLF CAR UNDER SEAT REMOVABLE AND PORTABLE STORAGE TOTE BAG

(71) Applicant: Textron Inc., Providence, RI (US)

(72) Inventors: Matthew J. Zaremba, Evans, GA (US); Richard K Harris, Pinckney, MI (US); Stephen E Tyrer, Northport, NY (US)

(73) Assignee: TEXTRON INNOVATIONS INC, Providence, RI (US)

( * ) Notice: Subject to any disclaimer, the term of this patent is extended or adjusted under 35 U.S.C. 154(b) by 284 days.

(21) Appl. No.: 17/202,861

(22) Filed: Mar. 16, 2021

(65) Prior Publication Data
US 2022/0297610 A1     Sep. 22, 2022

(51) Int. Cl.
*A45F 3/02*     (2006.01)
*B60R 7/04*     (2006.01)

(52) U.S. Cl.
CPC ............... *B60R 7/043* (2013.01); *A45F 3/02* (2013.01)

(58) Field of Classification Search
CPC ... B60R 7/043; B60R 5/00; B60R 2011/0029; B60R 2011/0059; B60R 2011/0071
USPC .......... 296/37.14, 37.15; 224/274, 404, 275, 224/542, 544, 572
See application file for complete search history.

(56) References Cited

U.S. PATENT DOCUMENTS

| | | |
|---|---|---|
| 9,266,417 B2 | 2/2016 | Nadeau et al. |
| 9,650,078 B2 | 5/2017 | Kinsman et al. |
| 9,764,767 B2 | 9/2017 | Proulx et al. |
| 9,789,909 B2 | 10/2017 | Erspamer et al. |
| 9,809,376 B2 * | 11/2017 | Mitchell .................... A45F 3/02 |
| 2002/0093158 A1 * | 7/2002 | Turner ....................... B62B 9/26 |
| | | 280/47.38 |
| 2016/0101924 A1 * | 4/2016 | Mitchell .................... A45F 3/02 |
| | | 220/592.2 |
| 2017/0217375 A1 * | 8/2017 | Wiley ...................... B60N 2/686 |
| 2020/0010125 A1 | 1/2020 | Peterson et al. |
| 2021/0068510 A1 * | 3/2021 | Johnson ................... A45C 7/009 |
| 2021/0076794 A1 * | 3/2021 | Benezri ...................... A45F 4/02 |
| 2021/0086047 A1 * | 3/2021 | Morgan .................. A63B 55/61 |

(Continued)

FOREIGN PATENT DOCUMENTS

| | | |
|---|---|---|
| CA | 2723779 C | 11/2009 |
| CA | 2937745 A1 | 8/2015 |
| CA | 2985632 A1 | 11/2016 |

(Continued)

*Primary Examiner* — Amy R Weisberg
*Assistant Examiner* — Sara Laghlam
(74) *Attorney, Agent, or Firm* — Sandberg Phoenix & von Gontard PC

(57) ABSTRACT

A removable and portable storage tote for an under seat storage system that comprises a front side constructed of a pliable material, a back side constructed of the pliable material, a left side constructed of the pliable material, a right side constructed of the pliable material, a bottom connected to the front side, the back side, the left side and the right side, and a top side constructed of a pliable material, that is hingedly connected to the back side and selectively connectable to the left side, right side and front. The storage tote additionally comprises a plurality of tether mechanisms attached to at least one of the front side, back side, left side and right side that are structured and operable to removably retain the tote within a cavity beneath a seat of a vehicle.

19 Claims, 10 Drawing Sheets

(56) References Cited

U.S. PATENT DOCUMENTS

2022/0340085 A1* 10/2022 Li .......................... B60R 7/043

FOREIGN PATENT DOCUMENTS

| CA | 2993414 | A1 | | 2/2017 | |
|----|---------|----|---|--------|---|
| CA | 2995034 | C  | | 2/2017 | |
| CA | 2952711 | A1 | | 6/2017 | |
| CA | 3046784 | A1 | | 6/2018 | |
| CN | 108372932 | A | * | 8/2018 | ......... B64D 11/0631 |

* cited by examiner

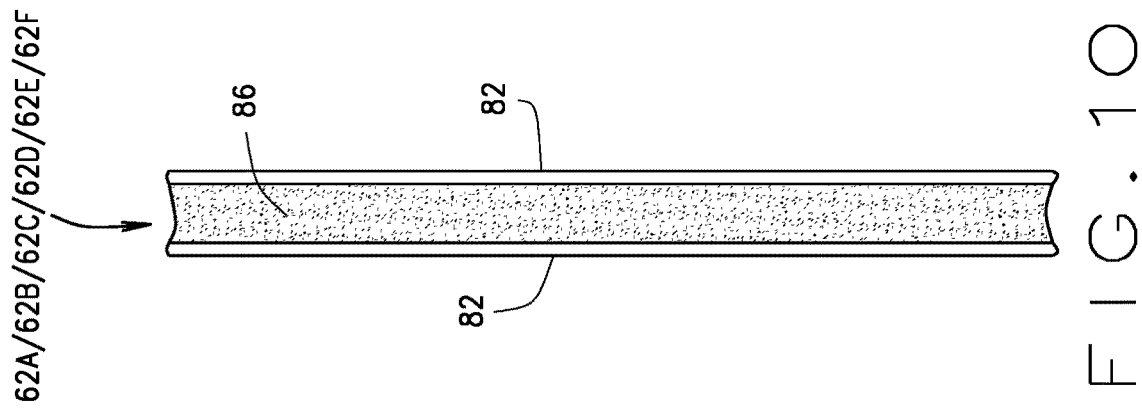
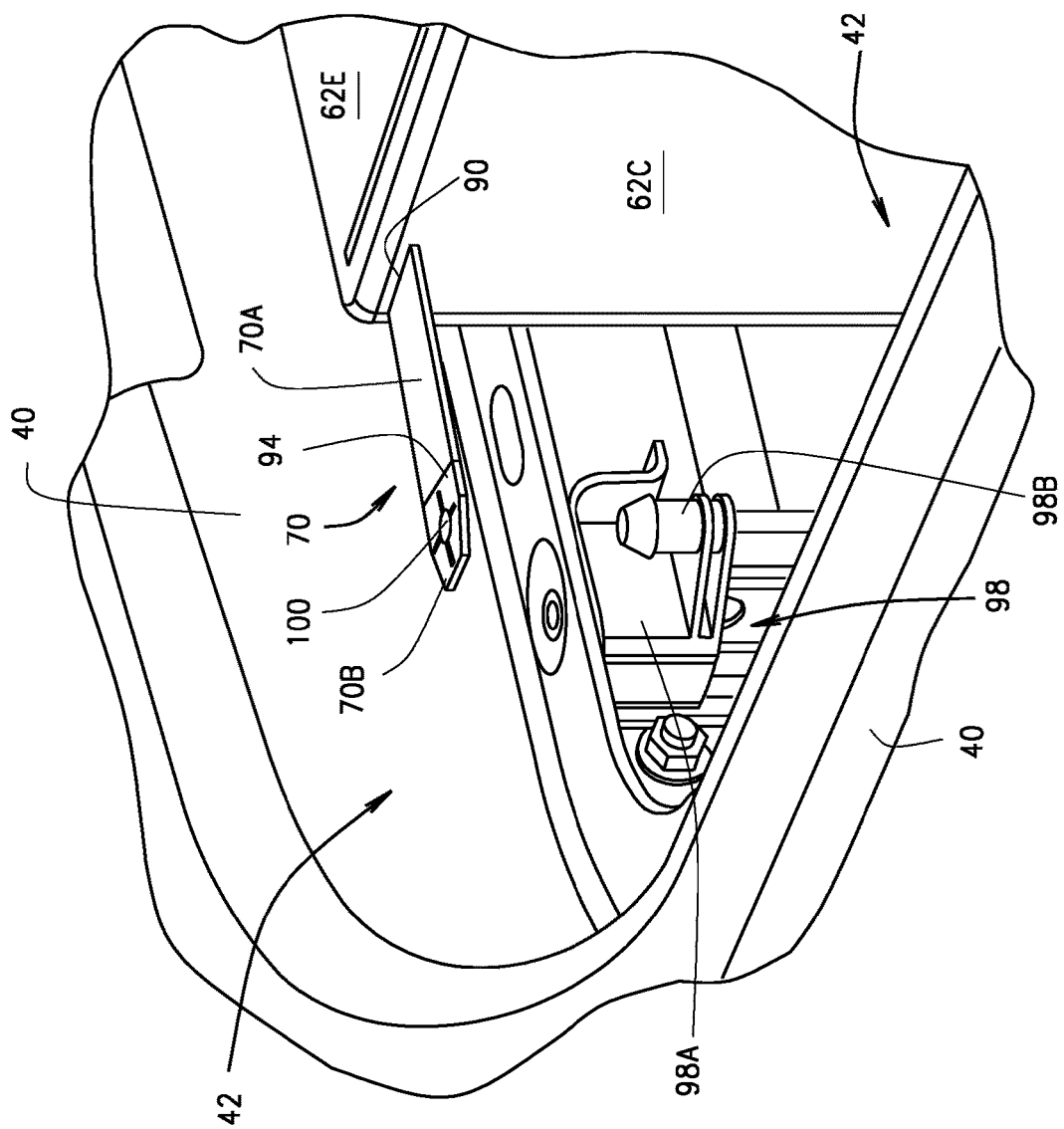

GOLF CAR UNDER SEAT REMOVABLE AND PORTABLE STORAGE TOTE BAG

FIELD

The present teachings relate to golf car storage space, and more particularly to a removable and portable golf car storage tote bag.

BACKGROUND

The statements in this section merely provide background information related to the present disclosure and may not constitute prior art.

A common consumer requested feature for golf cars, and moreover for golf cars that have been converted to personal use or transport vehicles (referred here in a PTVs), is increased and convenient storage space. Ever occurring improvements to golf cars and PTVs, for example the reduction of batter size, have created a significant increase in unused space beneath the front or main seat of electric powered golf cars and PTVs. Various under seat storage devices have been made to take advantage of this unused space. Generally, all such known storage designs are in the form of rigid plastic bins, containers or boxes that are generally fixed under the body and/or seat such that they are not quickly removable by hand (i.e., without the use of tools). Rather, such known designs are generally non-removably secured to the chassis and/or body under the front/main seat of such vehicles and require tools and time to be removed. Such rigid, fixed storage bins are not easily and quickly removable, are not easily hand carried and transportable to other locations, are inconvenient to use, cumbersome to load and unload, and not easily cleaned.

SUMMARY

The present disclosure generally provides a soft sided removable and portable storage tote bag that can be quickly disposed, secured and removed from a modified space under the front/main seat of a golf car, a PTV and any other such low speed vehicle. In various instances, the portable storage tote bag can be made of one or more layers of rugged (in various instances waterproof) material, and can include handles and/or a shoulder strap such that the portable storage tote can be easily and quickly removed from under the front/main seat and carried as a tote or duffel bag.

For example, in various embodiments the present disclosure provides a removable and portable storage tote for an under seat storage system that comprises a front side constructed of a pliable material, a back side constructed of the pliable material, a left side constructed of the pliable material, a right side constructed of the pliable material, a bottom connected to the front side, the back side, the left side and the right side, and a top side constructed of a pliable material, that is hingedly connected to the back side and selectively connectable to the left side, right side and front. The storage tote additionally comprises a plurality of tether mechanisms attached to at least one of the front side, back side, left side and right side that are structured and operable to removably retain the tote within a cavity beneath a seat of a vehicle.

In various other embodiments, the present disclosure provides an under seat storage system for a low speed vehicle, wherein the system comprises a plurality of connector devices mountable to structure of the vehicle within an interior cavity defined by a seat pedestal of the vehicle, and a removable and portable storage tote disposable within the interior cavity of the seat pedestal and removably securable to the connector devices. In various instances the portable storage tote comprises a front side constructed of a pliable material, a back side constructed of the pliable material, a left side constructed of the pliable material, a right side constructed of the pliable material, a bottom connected to the front side, the back side, the left side and the right side, and a top side constructed of a pliable material, that is hingedly connected to the back side and selectively connectable to the left side, right side and front. The under seat storage system additionally comprises a plurality of tether mechanisms attached to at least one of the front side, back side, left side and right side that are structured and operable to removably connect with the connector devices to removably secure the tote within the interior cavity the seat pedestal.

In yet other embodiments, the present disclosure provides a lightweight low speed vehicle, wherein the vehicle comprises a passenger compartment having a dash console, a floorboard, a seat pedestal, and a passenger seating structure supported by the seat pedestal. The vehicle additionally includes an under seat storage system, wherein the system, wherein the system comprises a plurality of connector devices mountable to structure of the vehicle within an interior cavity defined by a seat pedestal of the vehicle, and a removable and portable storage tote disposable within the interior cavity of the seat pedestal and removably securable to the connector devices. In various instances the portable storage tote comprises a front side constructed of a pliable material, a back side constructed of the pliable material, a left side constructed of the pliable material, a right side constructed of the pliable material, a bottom connected to the front side, the back side, the left side and the right side, and a top side constructed of a pliable material, that is hingedly connected to the back side and selectively connectable to the left side, right side and front. The under seat storage system additionally comprises a plurality of tether mechanisms attached to at least one of the front side, back side, left side and right side that are structured and operable to removably connect with the connector devices to removably secure the tote within the interior cavity the seat pedestal.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 9 is a close-up illustration the removable and portable storage tote shown in FIGS. 1 through 8 illustrating the connectivity of the tether mechanisms to a plurality of connector devices disposed within the interior under seat cavity, in accordance with various embodiments of the present disclosure.

FIG. 10 a cross-sectional view of a portion of any one or more of a front side, back side, left side, right side, top side and/or bottom of the removable and portable storage tote illustrating the thermal insulative construction thereof, in accordance with various embodiments of the present disclosure.

Figure 11:
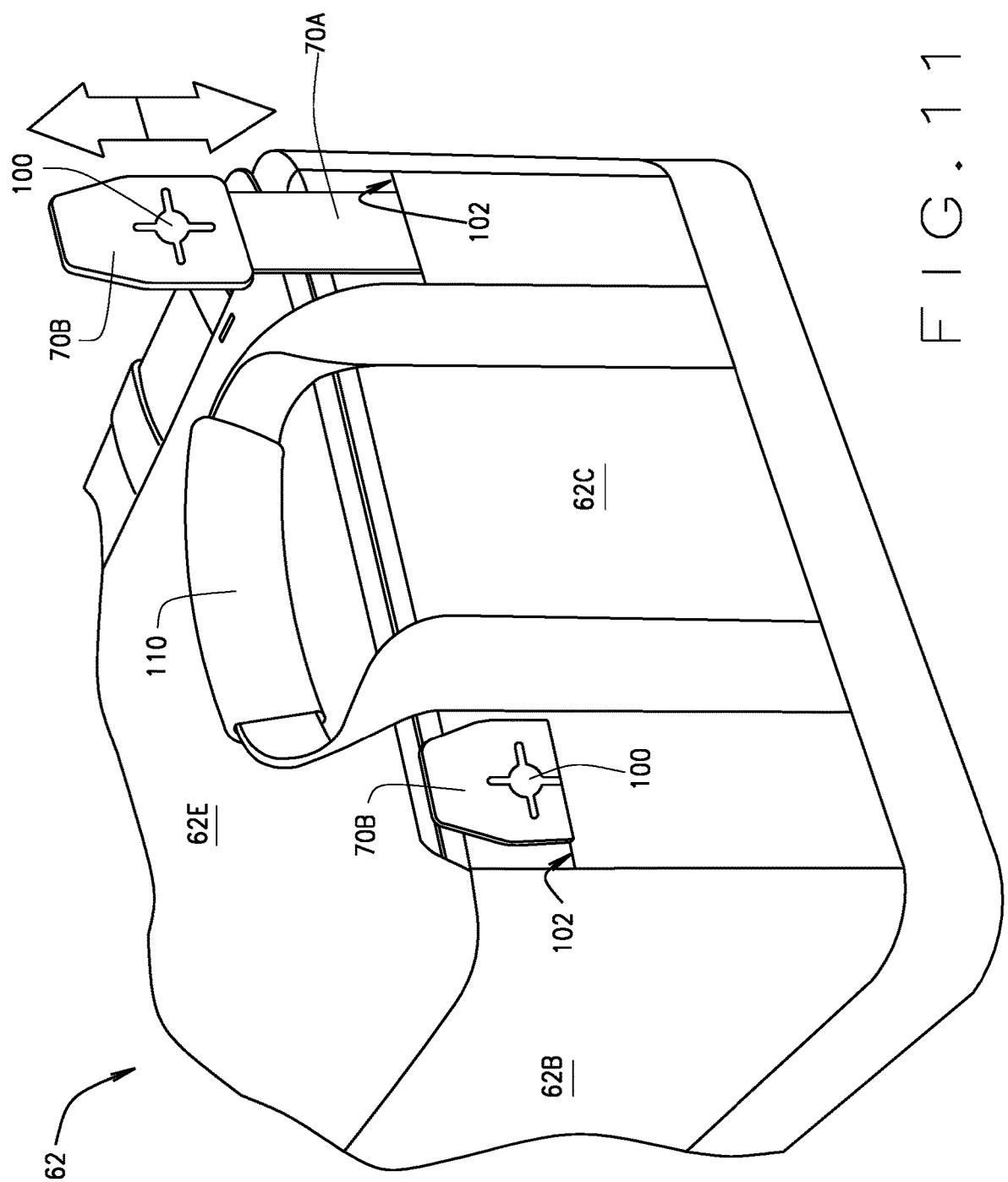

FIG. 11 is an exemplary illustration of the removable and portable storage tote shown in FIGS. 1 through 9 comprising retractable tether mechanisms, and including one or more handle and shoulder strap used to hand carry and transport the storage tote, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

As used herein, the word "forward" and the phrase "forward of" are used to describe the direction from a named component or structure toward the front of the vehicle shown in the various figures. Similarly, as used herein, the word "rearward" and the phrase "rearward of" are used to describe the direction from a named component or structure toward the rear of the vehicle.

Referring to FIGS. 1, 2, 3 and 4, in various embodiments, the present disclosure provides a lightweight vehicle 10 (e.g., a golf car, a personal transport vehicle (PTV) or any other low speed vehicle (LSV)) that generally includes a chassis or frame 14, a body 16 mounted to the chassis 14, a pair of rear wheels 18 and a pair of front wheels 22 operationally connected to the chassis 14, and a passenger compartment 26 defined by the body 16 and supported by the chassis 14. As used herein, the word "wheel(s)" will be understood to mean the structure consisting of the respective tire mounted on the respective wheel, also known as the rim or hub, particularly, the compilation of the tire and wheel/rim/hub. The passenger compartment 26 generally includes a dash or instrument console 30, a floorboard 34, and a main passenger seating structure 38 structured and operable to provide seating for one or more golf car occupants, e.g., a driver and one or more passengers. The seating structure 38 comprises at least one back rest 38A and at least one seat cushion 38B removably or hingedly mounted to and supported by a seat pedestal 40 that, in various instances, is formed as part of the body 16. The seat pedestal 40 defines an interior under seat vacant space or cavity or volume 42 disposed beneath the main passenger seating structure seat cushion(s) 38B. The under seat cavity 42 is structured and configured to removably retain a removable and portable storage tote bag 62 (as exemplarily shown in FIG. 4) such that the storage tote 62 is internally retained within the vehicle 10. Particularly, when the storage tote 62 is retained within the under seat cavity 42, as described below, the storage tote is completely internally enclosed within vehicle structure, that is, completely enclosed by the seat pedestal 40, the rear vehicle body 16, the floorboard 34 (or other vehicle structure enclosing the bottom of the under seat cavity 42), and the main passenger seating structure seat cushion 38B. The under seat cavity 42, removable and portable storage tote bag 62, and various other components and features described further below provide a removable and portable under seat storage system 66 of the present disclosure, as described further below.

The dash console 30 can include one or more instrument displays, gauges, vehicle control devices and/or storage compartments. For example, in various instances the dash console 30 can include one or more of a vehicle On/Off key switch for controlling the operation mode of the vehicle 10, a forward/neutral/reverse selector, one or more small accessory storage pockets, one or more telemetry gauges/readouts (e.g., a speedometer, tachometer, temperature gauge, etc.) an electronic display (e.g., an LCD display that can have touch capabilities), a radio, and/or various other vehicle controls. The floorboard 34 is structured and operable to enclose a bottom of, and provide a floor for, the passenger compartment 26. The passenger compartment 26 additionally includes a steering wheel 44 for use by the operator to control the directional movement of the vehicle 10, a brake pedal 46 for use by the operator to control slowing and stopping of the vehicle 10, and an accelerator pedal 50 for use by the operator to control the torque delivered by a prime mover 54 to one or more of the rear and/or front wheels 18 and/or 22.

As described above, the vehicle 10 includes a prime mover 54 operatively connected to a drivetrain 58 that is operatively connected to at least one of the rear and/or front wheels 18 and/or 22. The prime mover 54 can be any device that is structured and operable to generate torque (e.g., motive force, e.g., power) utilized to provide motive force for the vehicle 10 via the drivetrain 58. For example, in various embodiments, the prime mover 54 can be an electric motor. In other embodiments the prime mover 54 can be any other suitable motive power source and remain within the scope of the present disclosure. Although the drivetrain 58 of the present disclosure will, by way of example, will be shown and described herein as structured and operable to deliver motive force to the rear wheel(s) 18 (via a rear axle assembly not shown, but readily understood by one skilled in the art), it should be understood that, in various embodiments, the drivetrain 58 of the present disclosure can be structured and operable to deliver motive force to the front wheel(s) 22 (via a front axle assembly not shown, but readily understood by one skilled in the art), and remain within the scope of the present disclosure. In yet other embodiments, it is envisioned that drivetrain 58, as described herein can be implemented in a four-wheel drive vehicle operable to deliver motive force (i.e., power/torque) generated by the prime mover 54 to one or more of the front wheel(s) 22 and/or rear wheel(s) 18.

Referring now to FIGS. 1, 2, 3, 4, 5 and 6, as described above, the removable and portable under seat storage system 66 generally comprises the interior under seat vacant space or cavity 42 defined by seat pedestal 40 and disposed beneath the main passenger seating structure seat cushion(s) 38B, and the removable and portable storage tote 62. As used herein the term portable will be understood to mean that the storage tote 62 is sized, shaped, weighted and structured to be easily carried by hand by generally any person. For example, the storage tote 62 can have any desired size and shape such that the dimensions, volume and geometry of storage tote 62 can be easily lifted of and removed from the under seat cavity 42, carried by hand to a person's car or home, packed with suitable sized items such as food, beverages, cloths, towels, hats, ice, outdoor products (e.g., sunglasses, suntan lotion, lip balm, bug spray, etc.) and outdoor games and toys (e.g., balls, frisbees, racquets, etc.), carried by hand back to the vehicle 10, and disposed and secured within the under seat cavity 42, as described below. For example, it is envisioned that in various embodiments that tote bag can have a square or rectangular cuboid shape with a volume of 10 to 70 liters. The storage tote 62 comprises a front side 62A, a back side 62B a left side 62C, a right side 62D and top side 62E and a bottom 62F. The left and right sides 62C and 62D are connected to or integrally formed with the front and back sides 62A and 62B to form a perimeter wall of the storage tote. Additionally, the bottom 62F is connected to or integrally formed with a bottom edge of the front, back, left and right sides 62A, 62B, 62C and 62D (e.g., with a bottom edge of the perimeter wall) to form and define a enclosable interior stowage space 74 (see FIG. 8) of the storage tote 62. That is, when the storage tote 62 is disposed within the under seat cavity 42, the top side 62E will be in the closed position (e.g., hingedly connected to the back side 62B and selectably connected to the front, left and back sides 62A, 62B and 62C, for example via zipper 78) such that enclosable interior stowage space 74, and all items stored therein will be totally enclosed on all 6 sides, e.g., enclosed by the front, back, left, right, top and bottom sides 62A, 62B, 62C, 62D, 62E and 62F.

In various embodiments, the left, right, front and back sides 62C, 62D, 62A and 62B can be connected to or integrally formed together in a water-tight, leak-proof manner, and the bottom 62F can be connected to or integrally formed with a bottom edge of the perimeter wall 62A/62B/62C/62D in a water-tight, leak-proof manner such that enclosable interior stowage space 74 is water-tight and leak-proof. Additionally, in various embodiments, the front, back, left, right and top sides 62A, 62B, 62C, 62D and 62E can be constructed of one or more layer of a soft, pliable, collapsible, flexible and/or foldable material, and the bottom side 62F can have a rigid or semi-rigid construction such that the storage tote 62 can be removed from the under seat cavity 42 and collapsed and folded into a much smaller and compact storage/non-use size than the fully expanded and deployed operational/in-use size exemplarily shown in FIG. 6. Alternatively, in various embodiments, the bottom side 62F can also be constructed of one or more layer of a soft, pliable, collapsible, flexible and/or foldable material, such that the storage tote 62 can be removed from the under seat cavity 42 and collapsed and folded into an even smaller and compact storage/non-use size. For example, in various embodiments, the front, back, left, right and top sides 62A, 62B, 62C, 62D and 62E, and in various instances the bottom side 62F can be constructed of one or more layer of PVC, Vinyl, ABS, nylon, Kevlar®, canvas, leather, a waterproof material, or any other suitable material or fabric.

In various embodiments, the top side 62E is hingedly or pivotally connected along a back edge to the back 62B such that the top side 62E can be raised or opened to allow access to the enclosable interior stowage space 74, and lowered or closed to cover the enclosable interior stowage space 74 (and any item disposed therein). Additionally, in various embodiments, the top side 62E can be selectively connectable, attachable, or sealable along left, right and front edges to the left, right and front sides 62C, 62D and 62A such that the top side 62E can be selectably retained (i.e., as desired by a user) in the lowered or closed position. For example, in various instances, storage tote 62 can include a zipper 78 disposed along the top edges of the front, left and right sides 62A, 62C and 62D, and along the front, left and right edges of the top side 62E that is structured and operable to selectably retain the top side 62E in the lowered or closed position. In various embodiments, the zipper 78 can be structured and operable to selectably retain the top side 62E in a water-tight and leak-proof lowered or closed position. As exemplarily illustrated in FIG. 10, it is envisioned that in various embodiments the storage tote 62 can be a thermally insulated storage tote structured and operable to keep items (e.g., food and beverages) thermally insulated from the environment surrounding the storage tote 62 when the storage tote 62 is disposed and retained within the under seat cavity 42, and when the storage tote 62 is not disposed within the under seat cavity 42. For example, in various embodiments, the front, back, left, right and top sides 62A, 62B, 62C, 62D and 62E, and in various instances the bottom 62F, can be constructed to comprise a plurality of layers (e.g., 2, 3, 4 or more layers) of waterproof soft, pliable, collapsible, flexible and/or foldable material 82 having a soft, pliable, collapsible, flexible and/or foldable thermally insulative material 86 disposed between the layers 82. For example, in various embodiments, the layers 82 can be constructed nylon, Kevlar®, canvas, leather, or any other suitable material or fabric, and the thermally insulative material can comprise fiberglass, polyurethane glass wool, mineral wool, rock wool, cellulose or other flexible closed-cell insulation product.

Figure 6:
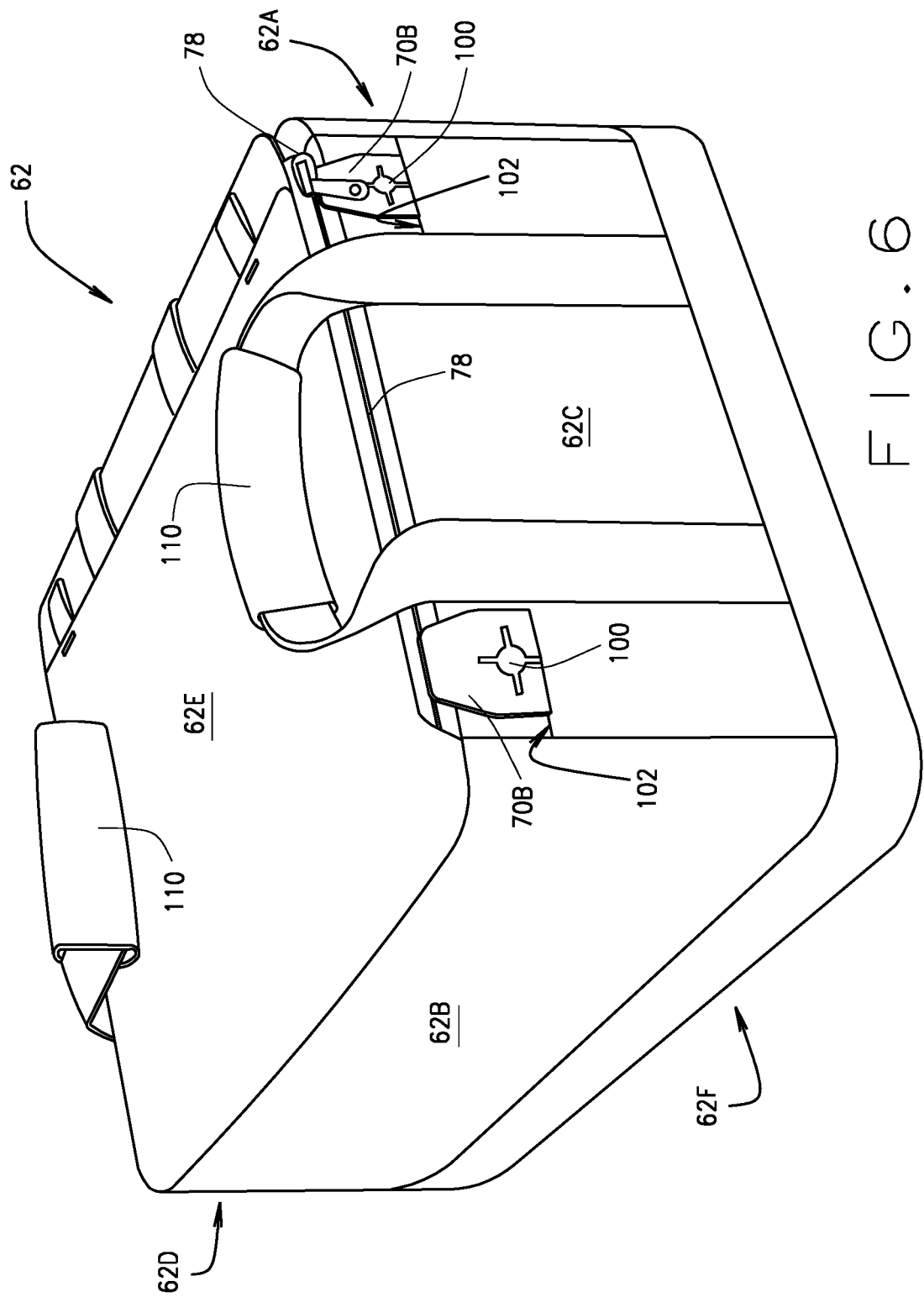
FIG. 6 is an exemplary illustration of the removable and portable storage tote shown in FIGS. 1 through 5 deployed in a fully expanded operational/in-use size and in a closed configuration, and including one or more handle and shoulder strap used to hand carry and transport the storage tote, in accordance with various embodiments of the present disclosure.
Figure 7:
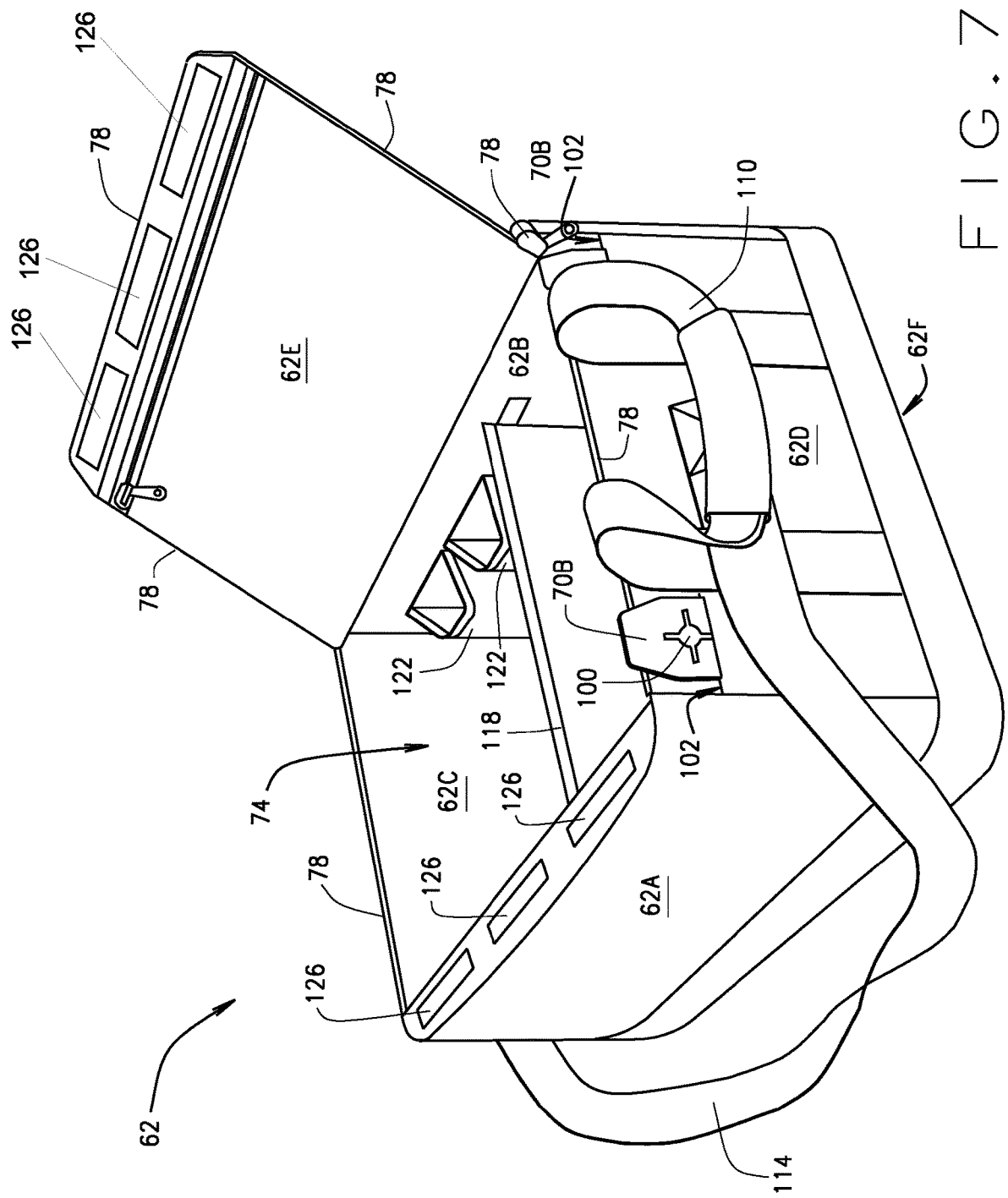
FIG. 7 is an exemplary illustration of the removable and portable storage tote shown in FIGS. 1 through 6 deployed in a fully expanded operational/in-use size and in an open configuration, and including one or more handle and shoulder strap used to hand carry and transport the storage tote, in accordance with various embodiments of the present disclosure.
Figure 8:
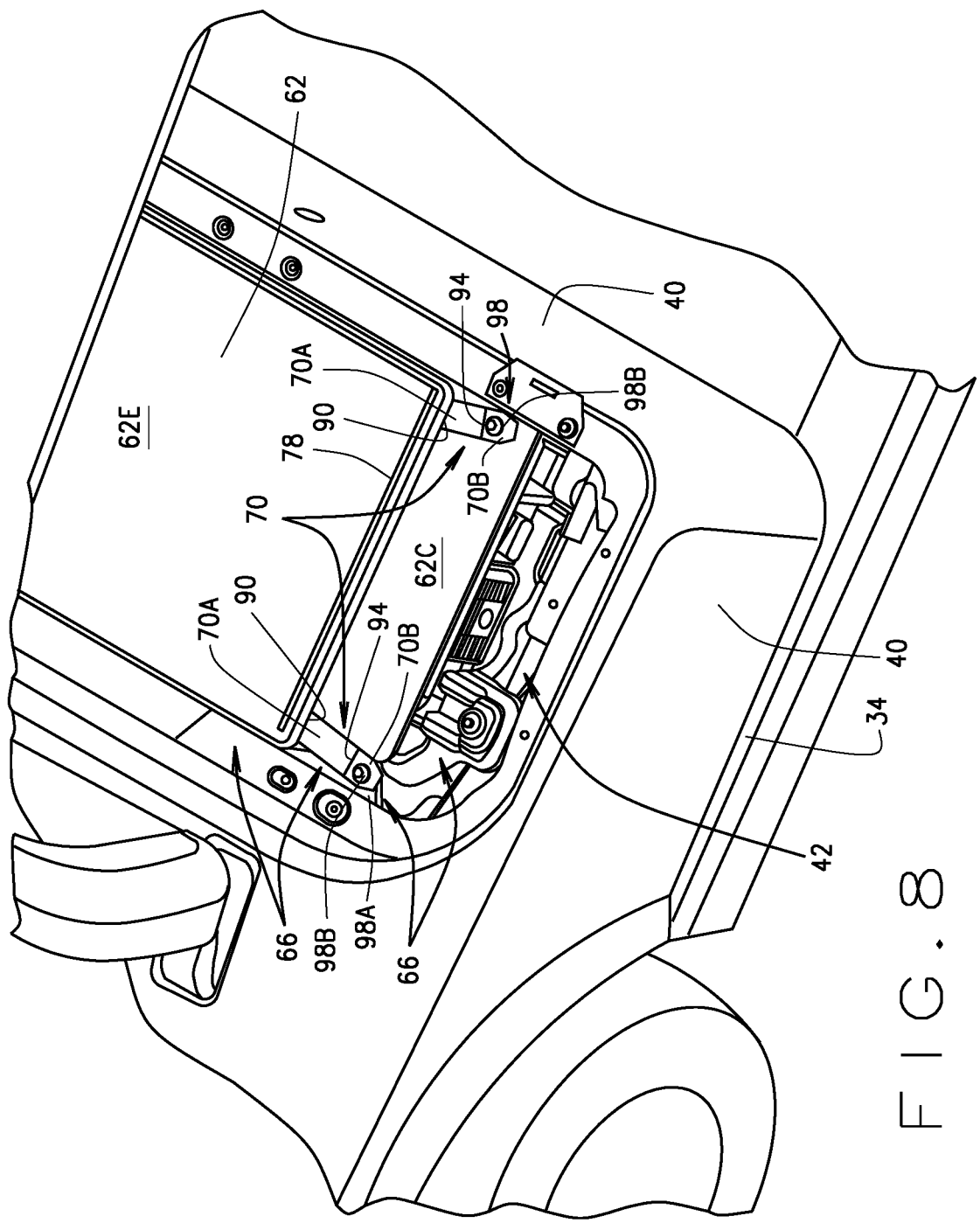
FIG. 8 is a close-up illustration the removable and portable storage tote shown in FIGS. 1 through 7 secured within the interior under seat cavity via the plurality of the tether mechanisms of the removable and portable under seat storage system, in accordance with various embodiments of the present disclosure.

Referring now to FIGS. 4, 5, 6, 7, 8 and 9, as described above, the storage tote 62, and hence the removable and portable under seat storage system 66, includes the plurality of tether mechanisms 70 attached to at least one of the front, back, left and side 62A, 62B, 62C and 62D that are structured and operable to locate, stabilize and removably retain and secure the storage tote 62 within the under seat cavity 42. More particularly, in various embodiments each tether mechanism 70 comprises a flexible or pliable strap 70A that is attached, secured, or connected to the at least one of the front, back, left and/or right side 62A, 62B, 62C and/or 62D at a proximal end 90 thereof, and a fixation device 70B attached to a distal end 94 of the strap 70A. As best shown in FIGS. 8 and 9, in various embodiments, the removable portable under seat storage system 66 further comprises a plurality of connector devices 98 mounted to structure of the vehicle within the interior cavity 42 of the seat pedestal 40 and disposed under the seat cushion 38B of the seating structure 38. For example, in various instances, the connector devices 98 are mounted to the structure or framework of the seat pedestal 40. Moreover, in various embodiments, the connector devices 98 are mounted to the structure or framework of the seat pedestal 40 using pre-existing connective structure and/or hardware of the vehicle 10 (e.g., of the seat pedestal 40) such as pre-existing apertures, brackets and/or nuts and bolts. Therefore, the vehicle 10 can be easily and readily retrofitted with removable portable under seat storage system 66 with few to no modifications to the structure of the vehicle 10. The fixation devices 70B of the tether mechanisms 70 are structured and operable to removably connect or interlock with a respective one of the connector devices 98.

For example, in various embodiments, each of the connector devices 98 can comprises a mounting body 98A having a headed post 98B extending therefrom, wherein the mounting body 98A is structured and operable to mount or connect to pre-existing mounting structure of the vehicle 10 (e.g., pre-existing mounting structure of the seat pedestal 40). In such embodiments, the headed post 98B comprises a mushroom-shaped post having a neck and a head having larger diameter than the neck (e.g., a bulbous head). Furthermore, in such embodiments each fixation device 70B can comprise a tongue connected to or integrally formed with the distal end 94 of the respective tether mechanism strap 70A (e.g., flexibly or pliable tether strap 70A), wherein each tongue includes an aperture 100 having a circumference that is slightly smaller than the circumference of the connector device head and slightly larger than the circumference of the connector device neck. Additionally, in such embodiments, each tongue can be structured such that the aperture 100 is resiliently and temporarily expandable such that the connector device head can be pushed or forced through the aperture 100 and the head of the headed post 98B will retain the tether mechanism tongue on the neck of the headed post 98B. Accordingly, each tether mechanism 70 can be removably connected or attached to a respective connector device 98.

Alternatively, in various other embodiments, the fixation devices 70B and the connector devices 98 can be any other suitable connecting, coupling, fastening, or interlocking devices that connect, couple, fasten or interlock with each other to removably connect or attach tether mechanisms 70 to connector devices 98. For example, in various instances fixation devices 70B and the connector devices 98 can be an elastic loop and a headed post (e.g., as described above), or the mating components of a snap fixture, or mating components of an buckle, or mating components of a spring biased interlocking connector, or hook and loop connective components (e.g., Velcro®), or any other suitable connective device. Therefore, to removably secure the storage tote 62 with in the under seat cavity 42, the tether mechanisms 70 can be removably connected or secured to the connector devices 98, via any suitable connecting, coupling, fastening, or interlocking fixation and connector devices 70B and 98, such as the headed posts and apertured tongues exemplarily described above and shown in the various figures.

Hence, to secure the storage tote 62 within the under seat cavity 42, an operator merely lifts the main seating structure seat cushion 38B, places the storage tote within the under seat cavity 42, easily and quickly connects the fixation devices 7B to the connector devices 98, and lowers the seat cushion 38B. Similarly ,to remove the storage tote 62 from within the under seat cavity 42, an operator merely lifts the seat cushion 38B, easily and quickly disconnects the fixation devices 7B from the connector devices 98, grasps one or more of the tote handles 110 or shoulder strap 114 (described below) and easily removes the storage tote 62 from the under seat cavity 42, and lowers the seat cushion 38B, where after the operator can easily hand transport the storage tote 62 to any desired location utilizing the handles and/or shoulder strap 110 and/or 114.

Referring now to FIGS. 6 and 7, in various embodiments, the front side, back side, left side and/or right side 62A, 62B, 62C and/or 62D of the storage tote 62 can be constructed to include a tether pocket 102 in which each of the tether mechanisms 70 can be stored when the storage tote 62 is removed from within the under seat cavity 42. More particularly, when the storage tote 62 is being removed from the under seat cavity 42 to be hand carried to a different location, the tether mechanisms 70 are disconnected from the connector devices 98 and the storage tote 62 is lifted out of the under seat cavity 42. Thereafter, the tether mechanisms 70 (e.g., having flexible or pliable tether straps 70A) can be conveniently push or tucked into the tether pockets 102 where they can be stored until the storage tote 62 is to be secured within the under seat cavity 42 again. As would be readily understood by one skilled in the art, in such embodiments, the proximal end 90 of each tether strap 70A of each tether mechanism 70 is attached, secured, or connected to the respective front, back, left and/or right side 62A, 62B, 62C and/or 62D of the storage tote 62 within the interior of the respective tether pocket 102.

Referring now to FIGS. 8, 9 and 11, in various embodiments, the tether mechanisms 70 can be retractably or elastically constructed or connected to storage tote 62. For example, in various embodiments, the tether straps 70A can be constructed or fabricated from a flexible and pliable elastic or retractable material such that to connect the fixation devices 70B of the tether mechanisms 70 to the connector devices 98 mounted to the vehicle 10 within the under seat cavity 42, the elastic/retractable tether straps 70A are stretched, thereby providing tension on the storage tote 62 at the location of each tether mechanism 70. Hence, when connected to the connector devices 98, each of the tether mechanisms 70 are substantially taut and the storage tote 62 is stably secured within the under seat storage cavity 42. In various embodiments, the elastic or retractable tether straps 70A can be attached, secured, or connected to the respective front, back, left and/or right side 62A, 62B, 62C and/or 62D of the storage tote 62 within the interior of the respective tether pocket 102, such that the tether mechanisms 70 are auto-retracted within the tether pockets 102 when the storage tote is disconnected from the connector devices and removed from within the under seat cavity 42.

Alternatively, in various other embodiments, the tether straps 70A can be constructed or fabricated from a non-elastic or non-retractable material, but are connected to the respective storage tote front, back, left and/or right side 62A, 62B, 62C and/or 62D via an retraction device, e.g., an elastic strap or cord connected at one end to the respective storage tote front, back, left and/or right side 62A, 62B, 62C and/or 62D and connected at the opposing end to the proximal end 90 of the tether strap 70A. Hence, to connect the fixation devices 70B of the tether mechanisms 70 to the connector devices 98 mounted to the vehicle 10 within the under seat cavity 42, the tether straps 70A are pulled, thereby stretching the retraction devices and providing tension on the storage tote 62 at the location of each tether mechanism 70. Accordingly, when connected to the connector devices 98, each of the tether mechanisms 70 are substantially taut and the storage tote 62 is stably secured within the under seat storage cavity 42. In various embodiments, the retraction devices can be attached, secured, or connected to the respective front, back, left and/or right side 62A, 62B, 62C and/or 62D of the storage tote 62 within the interior of the respective tether pocket 102, such that the tether mechanisms 70 are auto-retracted within the tether pockets 102 when the storage tote is disconnected from the connector devices and removed from within the under seat cavity 42.

Figure 1:
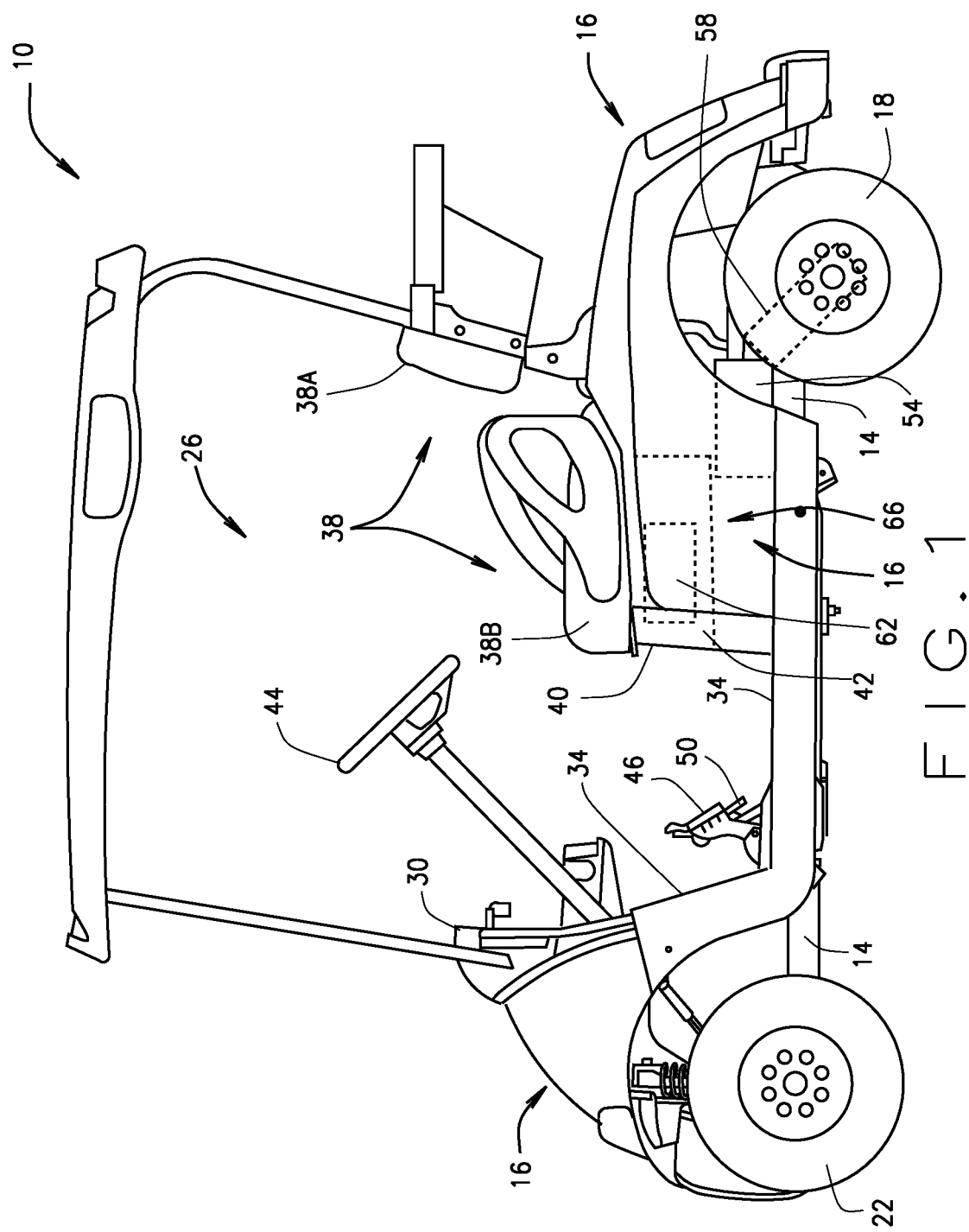
FIG. 1 is an illustration of a low speed vehicle, exemplarily illustrated as a golf car, comprising a removable and portable under seat storage system, in accordance with various embodiments of the present disclosure.
Figure 2:
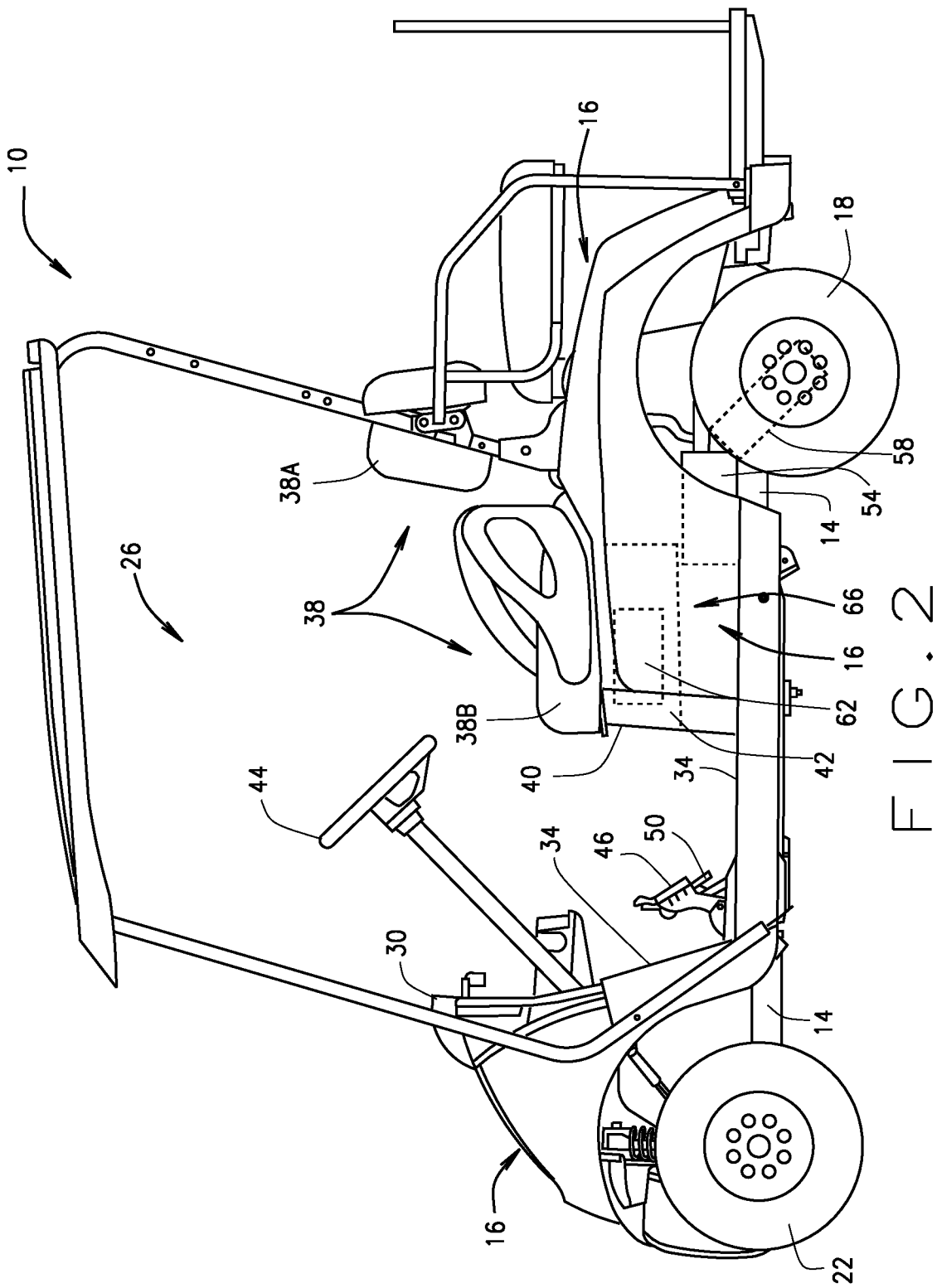
FIG. 2 is an illustration of the low speed vehicle shown in FIG. 1, exemplarily illustrated as a personal transport vehicle, comprising a removable and portable under seat storage system, in accordance with various embodiments of the present disclosure.
Figure 3:
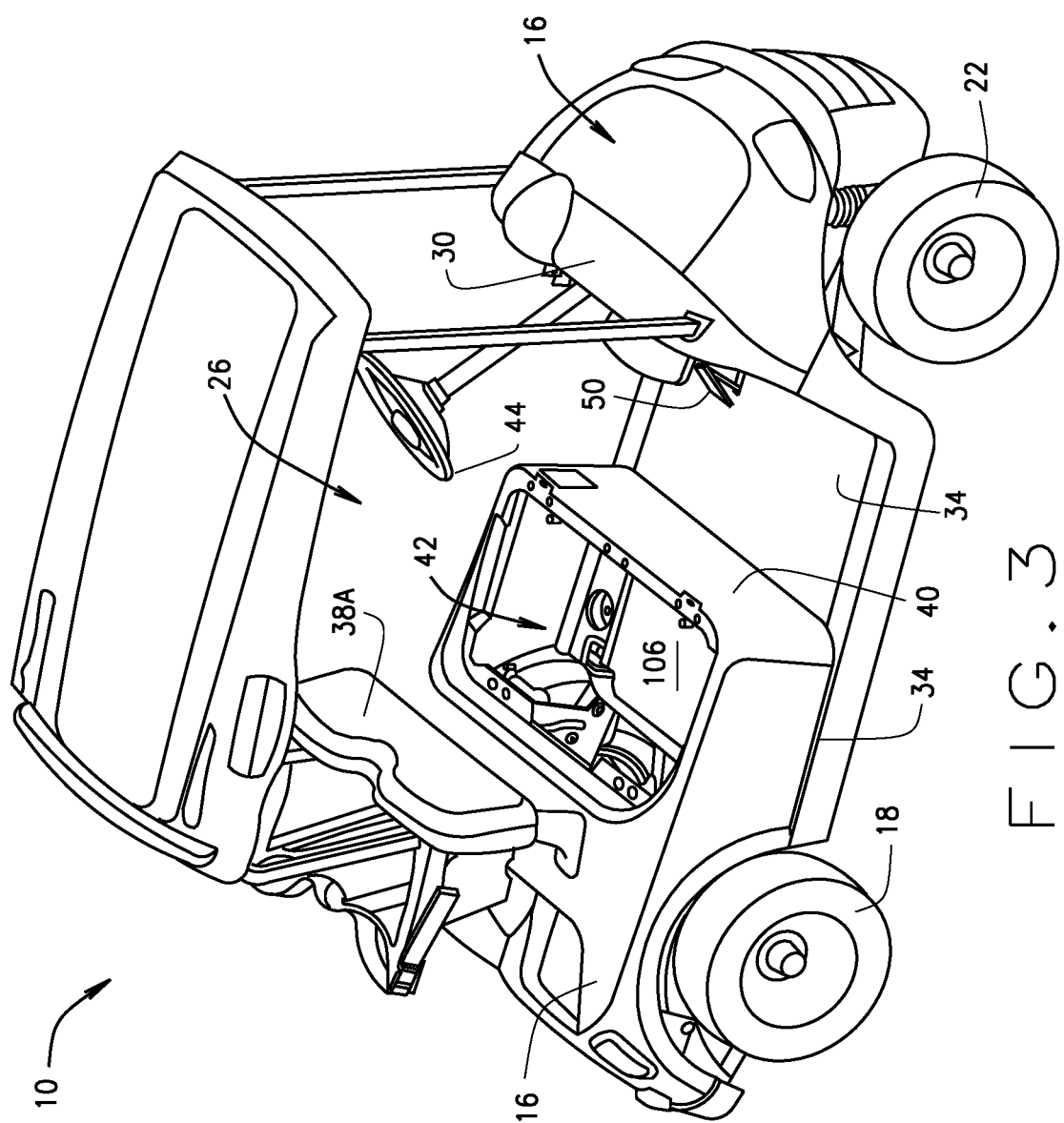
FIG. 3 is an illustration of the low speed vehicle show in FIGS. 1 and 2 having a seat cushion of the vehicle removed to an interior under seat cavity of the a removable and portable under seat storage system, in accordance with various embodiments of the present disclosure.
Figure 4:
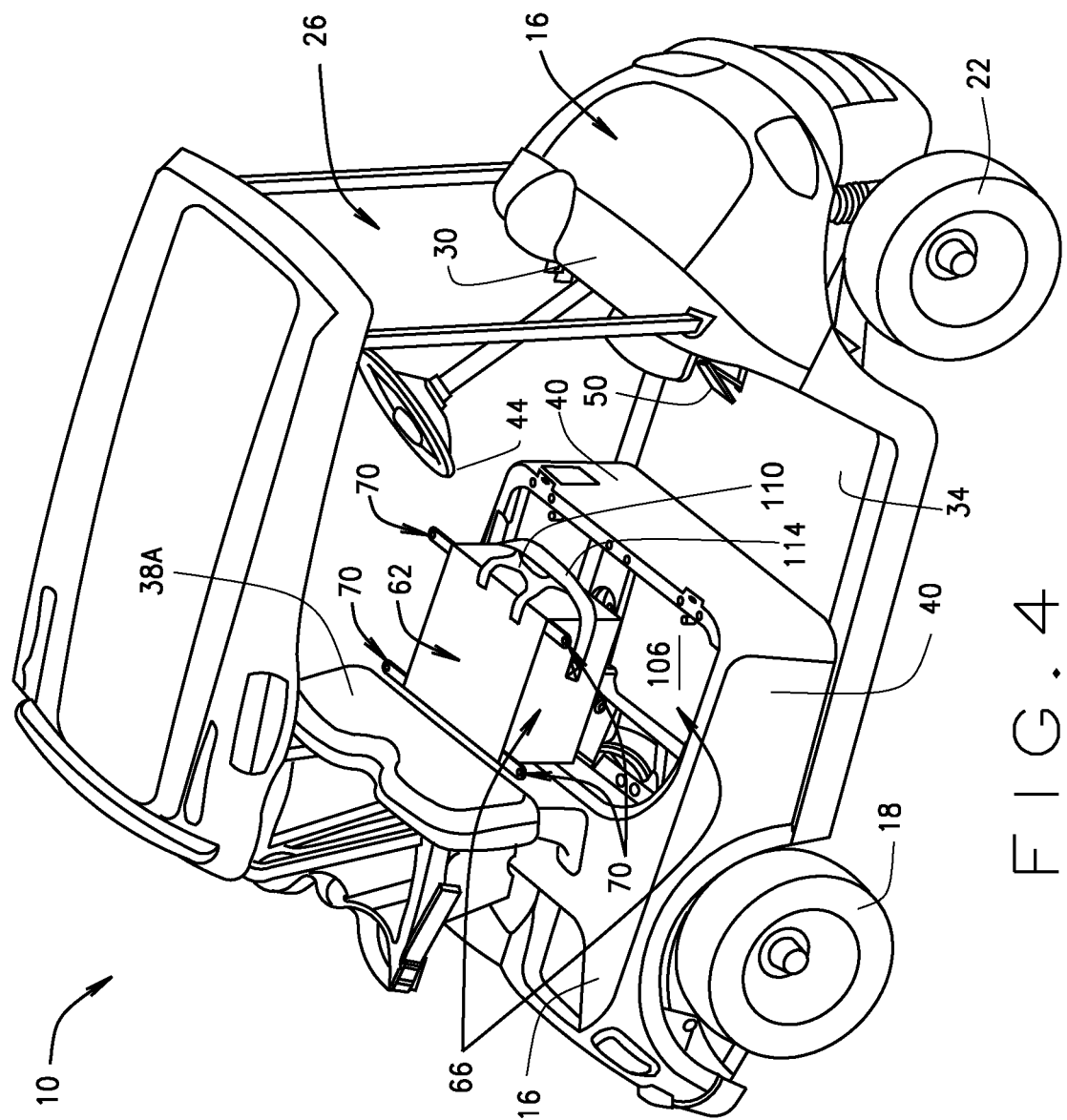
FIG. 4 is an illustration of the low speed vehicle show in FIGS. 1, 2 and 3 exemplarily illustrating how a removable and portable storage tote of the removable and portable under seat storage system can be disposed within the interior under seat cavity, in accordance with various embodiments of the present disclosure.
Figure 5:
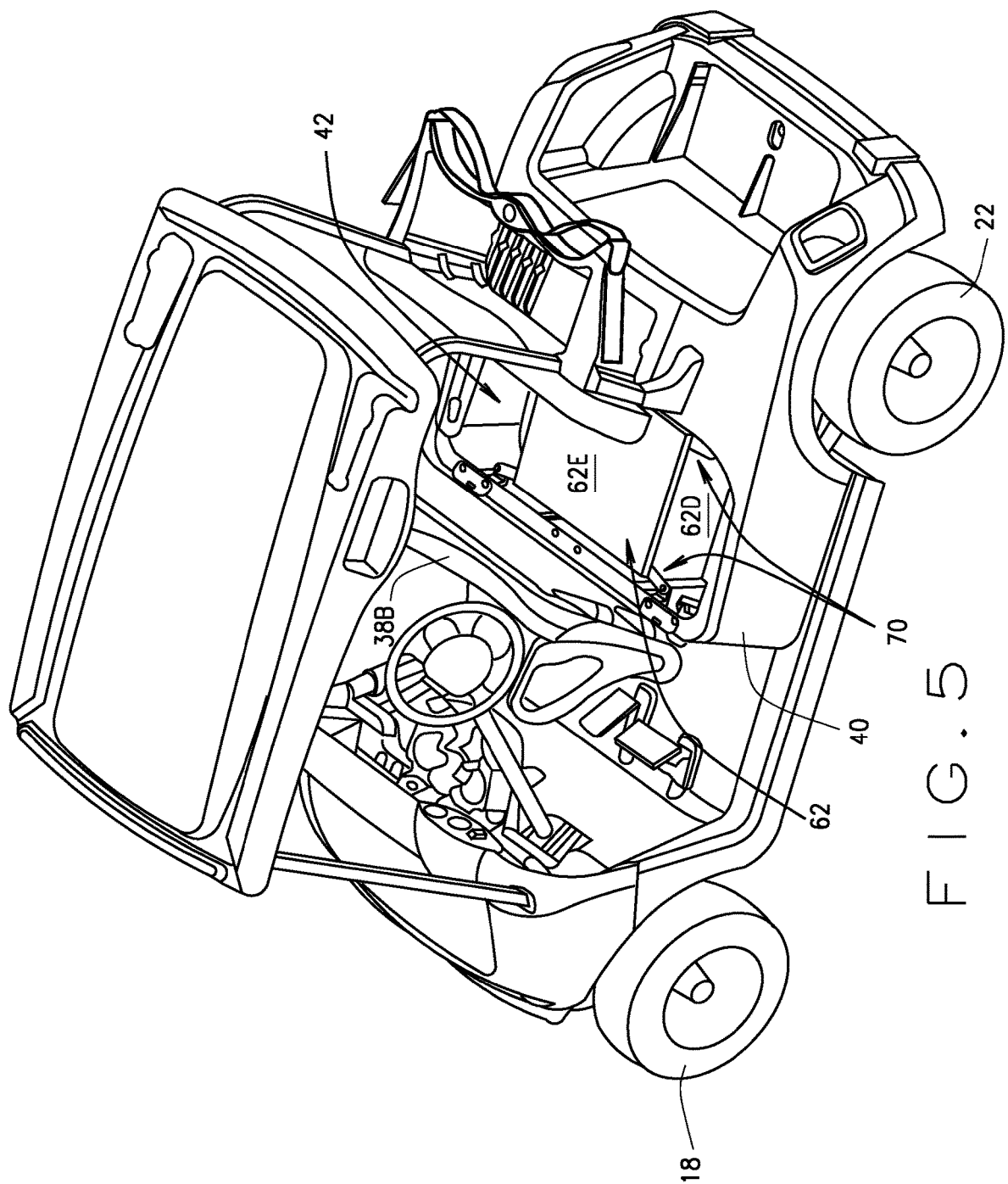
FIG. 5 is an illustration of the low speed vehicle show in FIGS. 1, 2, 3 and 4 exemplarily illustrating the removable and portable storage tote secured within the interior under seat cavity via a plurality of tether mechanisms of the removable and portable under seat storage system, in accordance with various embodiments of the present disclosure.

Referring now to FIGS. 3 and 4, in various embodiments, the removable portable under seat storage system 66 further comprises a storage tote platform and cover plate 106 disposed within the under seat cavity 42. In various instances, the platform and cover plate 106 is mounted to pre-existing mounting structure of the vehicle 10 within the under seat cavity 42 (e.g., pre-existing apertures, brackets and/or nuts and bolts), such that the vehicle 10 can be easily and readily retrofitted with removable portable under seat storage system 66 with few to no modifications to the structure of the vehicle 10. The platform and cover plate 106 is generally a flat plate mounted within the under seat cavity to cover various components of the vehicle, such as battery (ies), battery monitoring and control modules, electrical modules, motor controllers, other vehicle system and operation controllers, etc., and provide a surface for the storage tote 62 to sit, rest or otherwise be placed on when disposed and secured within the under seat cavity as described above. Accordingly, the platform and cover plate 106 is structured and operable provides a protective barrier between the storage tote 62 and vehicle components and other structure beneath the seat pedestal 40 and within the under seat cavity 42. In various embodiments, the platform and cover plate 106 can be constructed or fabricated of a non-electrically conductive or dielectric material, and/or a thermally insulative materials to provide an electrical and/or thermal insulative barrier between the storage tote 62 and vehicle components and other structure beneath the seat pedestal 40 and within the under seat cavity 42.

Referring now to FIG. 7, in various embodiments, the storage tote 62 can comprise one or more handle 110 and/or over the shoulder carrying strap 114 that are structured and operable to assist in carrying and handling the storage tote 62. Additionally, in various embodiments, the storage tote 62 can include one or more movable and removeable partition wall 118 that can be place within the enclosable interior stowage space 74 of the storage tote 62 and removably connected to front, back, left side and/or right side wall 62A, 62B, 62C and/or 62D, to partition the enclosable interior stowage space 74 into two or more compartments. Furthermore, in various embodiments, the storage tote 62 can comprise one or more interior pocket 122 integrally formed with or connected to one or more of the front, back, left side and/or right side wall 62A, 62B, 62C and/or 62D that are structured and operable to store smaller items and separate such item from other items disposed within the enclosable interior stowage space 74. Still further, in various embodiments, one or more of the top side, front side, left side and/or right side wall 62E, 62A, 62C and/or 62D can comprise one or more retainer device 126 that is structured and operable to assist in connection and retention of the top side 62E to the one or more of the front, left side and/or right side wall 62A, 62C and/or 62D such as hook and loop connective components (e.g. Velcro®), magnets, etc.

The removable and portable storage tote 62 disclosed herein is quickly and easily removably secured within the under seat cavity 42 defined by the seat pedestal 40 and comprises the plurality of shoulder straps 114 and handles 110 (and/or other grip mechanisms) that enable any desired and suitable items to be hand carried within the enclosed stowage space 74 by a single person when removed from the under seat cavity 42. The storage tote 62 further comprises the plurality of tether mechanisms 70 attached the front, back, left and/or right side 62A, 62B, 62C and/or 62D that are structured and operable to quickly and easily removably connect with the connector devices 98 to removably secure the tote within the enclosable interior cavity 42 of the seat pedestal 40.

Although the vehicle 10 has been exemplarily illustrated as a golf car and/or a personal transport vehicle (PTV) throughout the various figures, it should be understood that in various embodiments, the vehicle 10 can be a maintenance vehicle, a cargo vehicle, a shuttle vehicle, an all-terrain vehicle (ATV), a utility-terrain vehicle (UTV), a worksite vehicle, a buggy, any lightweight vehicle, or any other suitable type of utility or low-speed vehicle that is not designated for use on roadways, and remain within the scope of the present disclosure.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A method for removably stowing a portable storage tote of an under seat storage system within an interior cavity disposed under a seat of a vehicle within a seat pedestal of the vehicle, wherein the tote comprises:
   a front side constructed of a pliable material;
   a back side constructed of the pliable material;
   a left side constructed of the pliable material;
   a right side constructed of the pliable material;
   a bottom connected to the front side, the back side, the left side and the right side;
   a top side constructed of a pliable material, hingedly connected to the back side and selectively connectable to the left side, right side and front side to provide an enclosed stowage space defined by the front, back, left, right bottom and top sides; and
   a plurality of flexible tether mechanisms attached to at least one of the front side, back side, left side and right side, said method comprising
   stowing the storage tote within the interior cavity under a seat of a vehicle by connecting the plurality of flexible tether mechanisms to a plurality of connector devices mounted to structure of the vehicle within the interior cavity to retain the tote within the cavity beneath the seat of the vehicle.

2. The method of claim 1 wherein each tether mechanism is an auto-retractable tether mechanism comprising:
   an auto-retractable strap that is attached to the at least one of the front side, back side, left side and right side at a proximal end thereof within a respective one of a plurality of tether strap pockets formed on an exterior of the at least one of the front side, back side, left side and right side, wherein the auto-retractable strap is structured and operable automatically retract within the respective one of the plurality of tether strap pockets; and
   a fixation device attached to a distal end of the auto-retractable,
   wherein connecting the plurality of auto-retractable tether mechanisms to a plurality of connector devices comprises withdrawing each auto-retractable strap from within a respective one of the plurality of tether strap pockets and connecting the respective fixation device to a respective one of the plurality of connector devices disposed within vehicle.

3. The method of claim 2 further comprising
   removing the storage tote from within the interior cavity under a seat of a vehicle by disconnecting each fixation device from the respective connector devices mounted to structure of the vehicle within the interior cavity, and
   allowing the auto-retractable strap of each auto-retractable tether mechanisms to automatically retract within the respective one of the plurality of tether strap pockets.

4. The method of claim 1, wherein the front side, back side, left side, right side and top side comprise a plurality of layers of waterproof pliable material having a thermally insulative material disposed between the layers.

5. The method of claim 1, wherein:
the bottom is connected to the front side, the back side, the left side and the right side in a water-tight, leak-proof manner,
the left side and right side are one of connected to and integrally formed with the front side and the back side in a water-tight, leak-proof manner, and
the top side is hingedly connected to the back side and selectively connectable to the left side, right side and front side in a water-tight, leak-proof manner to define an enclosed water-tight, leak-proof interior stowage space of the tote.

6. The method of claim 1 further comprises at least one of a plurality of carrying handles and a shoulder strap that are structured and operable to allow the storage tote to be hand transported to a remote location.

7. An under seat storage system of a vehicle, said system comprising:
a plurality of connector devices disposed within an interior cavity of a seat pedestal of a vehicle and mounted to structure of the vehicle within the interior cavity of the vehicle; and
a removable and portable storage tote disposable within the interior cavity of the seat pedestal and removably securable to the connector devices, said tote comprising:
a front side constructed of a pliable material;
a back side constructed of the pliable material;
a left side constructed of the pliable material;
a right side constructed of the pliable material;
a bottom connected to the front side, the back side, the left side and the right side;
a top side constructed of a pliable material, hingedly connected to the back side and selectively connectable to the left side, right side and front side to provide an enclosed stowage space defined by the front, back, left, right bottom and top sides; and
a plurality of tether mechanisms attached to at least one of the front side, back side, left side and right side that are structured and operable to removably connect with the connector devices to removably secure the tote within the interior cavity the seat pedestal.

8. The system of claim 7, wherein each tether mechanism comprises:
a strap that is attached to the at least one of the front side, back side, left side and right side at a proximal end thereof; and
a fixation device attached to a distal end of the strap and structured and operable to removably connect to a respective one of the connector devices.

9. The system of claim 8, wherein the tote further comprises a plurality of tether strap pockets formed on an exterior of the at least one of the front side, back side, left side and right side and each tether strap is attached to the at least one of the front side, back side, left side and right side within a respective one of the tether strap pockets.

10. The system of claim 9, wherein each tether strap is retractably connected within the respective one of the plurality of tether strap pockets.

11. The system of claim 7, wherein the front side, back side, left side, right side and top side comprise a plurality of layers of waterproof pliable material having a thermally insulative material disposed between the layers.

12. The system of claim 7, wherein:
the bottom is connected to the front side, the back side, the left side and the right side in a water-tight, leak-proof manner,
the left side and right side are one of connected to and integrally formed with the front side and the back side in a water-tight, leak-proof manner, and
the top side is hingedly connected to the back side and selectively connectable to the left side, right side and front side in a water-tight, leak-proof manner to define an enclosed water-tight, leak-proof interior stowage space of the tote.

13. The system of claim 7, wherein the removable and portable storage tote further comprises at least one of a plurality of carrying handles and a shoulder strap that are structured and operable to allow the storage tote to be hand transported to a remote location.

14. A vehicle, said vehicle comprising:
a passenger compartment, the passenger compartment comprising:
a dash console;
a floorboard;
a seat pedestal; and
a passenger seating structure supported by the seat pedestal; and
an under seat storage system, the system comprising:
a plurality of connector devices mounted to structure of the vehicle within an interior cavity defined by the seat pedestal and disposed under the seating structure; and
a removable and portable storage tote disposable within the interior cavity of the seat pedestal and removably securable to the connector devices, said tote comprising:
a front side constructed of a pliable material;
a back side constructed of the pliable material;
a left side constructed of the pliable material;
a right side constructed of the pliable material;
a bottom connected to the front side, the back side, the left side and the right side;
a top side constructed of a pliable material, hingedly connected to the back side and selectively connectable to the left side, right side and front side to provide an enclosed stowage space defined by the front, back, left, right bottom and top sides; and
a plurality of tether mechanisms attached to at least one of the front side, back side, left side and right side that are structured and operable to removably connect with the connector devices to removably secure the tote within the interior cavity the seat pedestal.

15. The vehicle of claim 14, wherein each tether mechanism comprises:
a strap that is attached to the at least one of the front side, back side, left side and right side at a proximal end thereof; and
a fixation device attached to a distal end of the strap and structured and operable to removably connect to a respective one of the connector devices.

16. The vehicle of claim 15, wherein the tote further comprises a plurality of tether strap pockets formed on an exterior of the at least one of the front side, back side, left side and right side and each tether strap is attached to the at least one of the front side, back side, left side and right side within a respective one of the tether strap pockets.

17. The vehicle of claim 16, wherein each tether strap is retractably connected within the respective one of the plurality of tether strap pockets.

18. The vehicle of claim 14, wherein the front side, back side, left side, right side and top side comprise a plurality of layers of waterproof pliable material having a thermally insulative material disposed between the layers.

19. The vehicle of claim 14, wherein:

The tote bottom is connected to the front side, the back side, the left side and the right side of the tote in a water-tight, leak-proof manner, the left side and right side are one of connected to and integrally formed with the front side and the back side in a water-tight, leak-proof manner, and the top side is hingedly connected to the back side and selectively connectable to the left side, right side and front side in a water-tight, leak-proof manner to define an enclosed water-tight, leak-proof interior stowage space of the tote.

* * * * *